A. POUCHAIN.
MANUFACTURE OF NEGATIVE PLATES FOR ELECTRIC ACCUMULATORS.
APPLICATION FILED JUNE 22, 1920.
1,366,491. Patented Jan. 25, 1921.
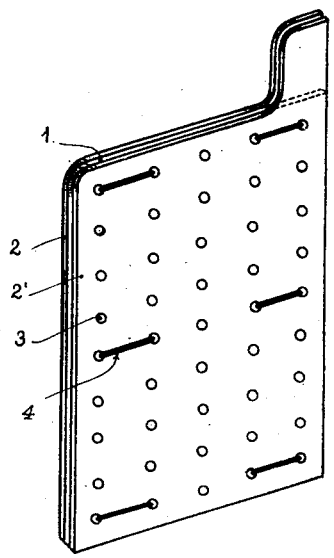
Inventor.
Adolfo Pouchain
By Lawrence Langner
Attorney.

UNITED STATES PATENT OFFICE.

ADOLFO POUCHAIN, OF TURIN, ITALY.

MANUFACTURE OF NEGATIVE PLATES FOR ELECTRIC ACCUMULATORS.

1,366,491.   Specification of Letters Patent.   Patented Jan. 25, 1921.

Application filed June 22, 1920. Serial No. 390,916.

*To all whom it may concern:*

Be it known that I, ADOLFO POUCHAIN, a subject of the King of Italy, and resident of Turin, Italy, have invented certain new and useful Improvements in the Manufacture of Negative Plates for Electric Accumulators, of which the following is a specification.

This invention relates to negative plates for electric accumulators.

According to this invention the negative plate is formed of two amalgamated zinc plates mounted on the opposite faces of a support consisting of a rigid material which is not attacked by dilute sulfuric acid, for instance celluloid or a derivative thereof, a dried varnish, shellac or the like.

The accompanying drawing shows in perspective a form of plate in accordance with the invention.

It consists of a plate of celluloid 1 held between two plates of zinc 2, 2', having perforations 3. These three plates are firmly held together in any suitable manner, for instance the celluloid may be interposed between the zinc plates while in a plastic state and the three plates then pressed together.

This compression causes the celluloid to enter the perforations 3 of the zinc plates and thus form keys or rivets which when the celluloid has hardened connect perfectly the two plates of zinc with their support.

On the outer faces of the two of the zinc plates 2, 2', the perforations should be widened, or small grooves should be made between adjacent perforations, which grooves may become filled with the material constituting the support 1 and thus form ties, such as indicated at 4, to increase the firmness of the union of each zinc plate with the support.

Whatever may be the means adopted for mounting the zinc plates on the support 1, the zinc plates should be well amalgamated and the adhesion between the plates and the faces of the support should be as perfect as possible.

In a plate constructed according to the invention the thickness of the zinc may be reduced to a minimum with advantage from the point of view of weight of the plate and at the same time the permanence of the mercury on the inner surfaces of the two plates of zinc is insured.

It has been found that even when the zinc layer has been completely eaten away at any zone of the plate, for example by reason of local action, the deposit will form a coating on the celluloid support during the subsequent re-charging owing to the fact that there adheres to the surface of the support a very thin layer of mercury which was originally on the surface of the zinc plate, so that the surface of the support itself becomes conductive.

What I claim as my invention and desire to secure by United States Letters Patent is:—

1. A negative plate for electric accumulators consisting of a supporting plate of rigid material non-attackable by the electrolyte, and two plates of zinc each adhering to a face of said supporting plate.

2. A negative plate for electric accumulators consisting of a supporting plate of rigid material non-attackable by the electrolyte, and two amalgamated plates of zinc each adhering to a face of said supporting plate.

3. A negative plate for electric accumulators consisting of a plate of celluloid and two plates of zinc, each zinc plate adhering on a face of the celluloid plate.

4. A method of forming a negative plate for electric accumulators, consisting in interposing between two perforated zinc plates a layer of plastic material non-attackable by the electrolyte, and pressing the zinc plates together so as to cause the plastic material to enter the perforations therein and form connecting keys between said plates.

Signed at Turin, Italy, this 26th day of May, 1920.

ADOLFO POUCHAIN.